United States Patent
Seurujärvi et al.

(10) Patent No.: US 7,565,146 B2
(45) Date of Patent: Jul. 21, 2009

(54) INTERCEPTING A CALL CONNECTION TO A MOBILE SUBSCRIBER ROAMING IN A VISITED PLMN (VPLMN)

(75) Inventors: Jorma Seurujärvi, Tampere (FI); Antti Laurila, Tampere (FI); Urpo Kärki, Orivesi (FI)

(73) Assignee: Nokia Corporation, Espoo (FI)

( * ) Notice: Subject to any disclaimer, the term of this patent is extended or adjusted under 35 U.S.C. 154(b) by 826 days.

(21) Appl. No.: 10/495,861

(22) PCT Filed: Dec. 21, 2001

(86) PCT No.: PCT/EP01/15246

§ 371 (c)(1),
(2), (4) Date: May 18, 2004

(87) PCT Pub. No.: WO03/055249

PCT Pub. Date: Jul. 3, 2003

(65) Prior Publication Data

US 2005/0027866 A1    Feb. 3, 2005

(51) Int. Cl.
H04W 40/00    (2006.01)
H04W 4/00    (2006.01)

(52) U.S. Cl. ................ 455/445; 455/432.1; 455/433
(58) Field of Classification Search ............ 370/401; 379/70; 455/414.1, 424, 445, 433, 432, 432.1–432.3
See application file for complete search history.

(56) References Cited

U.S. PATENT DOCUMENTS 6,122,499 A * 9/2000 Magnusson ............ 455/405

(Continued)

FOREIGN PATENT DOCUMENTS

WO    WO 98/36548    8/1998

(Continued)

OTHER PUBLICATIONS

Miettinen, Kari "Lawful Interception in GPRS/UMTS Network" May 7, 1999, Department of Computer Science, University of Helsinki; pp. 1-20.

(Continued)

*Primary Examiner*—Lester Kincaid
*Assistant Examiner*—Nathan Mitchell
(74) *Attorney, Agent, or Firm*—Squire, Sanders & Dempsey, L.L.P.

(57) ABSTRACT

The present invention relates to a method for intercepting a connection established in a communication network system between a called terminal (B) and a calling terminal (A), said network system comprising at least two communication networks (HPLMN, VPLMN) having an interface towards each other, said called terminal (B) being registered to a subscriber database entity (HLR, HSS) of one of said communication networks (HPLMN) while being located in another one (VPLMN) of said communication networks, the method comprising the steps of: initiating a connection establishment from said calling terminal (A) towards said called terminal (B), requesting, during connection establishment, said subscriber database entity (HLR, HSS) to which said called terminal (B) is registered, for subscriber related information, detecting that said requested information contains an indication that connections to said called subscriber (B) are to be intercepted, and tapping the established connection between the called (B) and calling terminal (A) at the interface between said networks.

30 Claims, 3 Drawing Sheets

U.S. PATENT DOCUMENTS

| | | | |
|---|---|---|---|
| 6,131,032 A * | 10/2000 | Patel | 455/445 |
| 6,405,030 B1 * | 6/2002 | Suprunov | 455/410 |
| 6,577,865 B2 * | 6/2003 | Dikmen et al. | 455/433 |
| 6,871,070 B2 * | 3/2005 | Ejzak | 455/435.1 |
| 6,922,466 B1 * | 7/2005 | Peterson et al. | 379/88.09 |
| 7,116,786 B2 * | 10/2006 | McKibben et al. | 380/286 |
| 2002/0049913 A1 * | 4/2002 | Lumme et al. | 713/201 |
| 2002/0051457 A1 * | 5/2002 | Eloranta | 370/401 |
| 2002/0078384 A1 * | 6/2002 | Hippelainen | 713/201 |
| 2005/0063544 A1 * | 3/2005 | Uusitalo et al. | 380/277 |

FOREIGN PATENT DOCUMENTS

| | | |
|---|---|---|
| WO | WO 00/28773 | 5/2000 |
| WO | WO 00/76189 A1 | 12/2000 |

OTHER PUBLICATIONS

3GPP TS 23.002 V5.4.0 (Oct. 2001); 3r Generation Partnership Project; Technical Specification Group Services and Systems Aspects; Network Architecture (Release 5); pp. 1-48.

3GPP TS 23.228 V5.2.0 (Oct. 2001); 3r Generation Partnership Project; Technical Specification Group Services and System Aspects; IP Multimedia Subsystem (IMS); Stage 2 (Release 5); pp. 1-123.

3GPP TS 33.107 V3.1.0 (Dec. 2000); 3r Generation Partnership Project; Technical Specification Group Services and System Aspects; 3G Security; Lawful Interception Architecture and Functions (Release 1999); pp. 1-55.

ETSI TS 101 629 V7.0.0, *Digital Cellular Telecommunications System (Phase 2+); Support of Optimal Routeing (SOR); Service Definition (Stage 1)* (GSM 02.79 version 7.0.0 Release 1998), Aug. 1999, pp. 1-16.

D4: M. Mouly and M.B. Pautet,—XP-002103158, "the GSM System for Mobile Communications" "8.Communication Management", 1992, pp. 501-565.

Communication from the European Patent Office (Summons to Attend Oral Proceedings), for EP Application No. 01989614.1, Dec. 7, 2006.

* cited by examiner

INTERCEPTING A CALL CONNECTION TO A MOBILE SUBSCRIBER ROAMING IN A VISITED PLMN (VPLMN)

FIELD OF THE INVENTION

The present invention relates to a method for intercepting a connection established in a communication network system.

BACKGROUND OF THE INVENTION

With the recent progress of communication networks such as mobile communication networks, facilities have to be provided for in order to intercept calls and/or connections in these networks. By intercepting these calls, law enforcement agencies such as the police or secret services are thus enabled to gather more information about suspicious or even criminal persons and to initiate suitable countermeasures against and/or to prosecute unlawful actions or the like.

It is to be noted that the present invention as described later on is not restricted to any type of communication network. For example, it is applicable to GSM communication networks as well as to more developed communication networks, like $3^{rd}$ generation networks e.g. UMTS and so called All IP networks utilizing IM multimedia subsystem specified by 3GGP. Those more developed networks are for example described in the 3GPP specifications such as 3GPP TS 23.002 V5.4.0 (2001-10) and 3GPP TS23.228 V5.2.0 (2001-10). Also, a terminal means any user equipment by means of which a user/subscriber to the network may access the network, whether wireless or wirebound.

The communication networks may be assumed to have the standardized configuration except for the particularities explained in connection with the present invention. Therefore, a detailed description of the communication network architecture and/or involved functionality of the network entities is considered to be dispensable here as a skilled person may safely be aware of those aspects of communication networks.

Also, a detailed introduction to interception, i.e. lawful interception as such and the involved authorities and entities is considered to be known to skilled persons. For example, Kari Miettinen of the Department of Computer Science, University of Helsinki, Finland, has given a rather comprehensive overview over "Lawful Interception in GPRS/UMTS Network", May 7, 1999. Although focusing on GPRS particularities in interception, the basic concepts as outlined in detail in chapter 2 still hold for the framework of the present invention. This means that the definitions of general principles (chapter 2.1.), standardized environment (chapter 2.2.), and parties and roles (chapter 2.3.) to a large extent can be applied to the present invention, so that a detailed description thereof can be omitted from the present specification.

In the currently existing implementation of legal interception the subscriber's call interception activation information is stored in the HLR's subscriber database and the HLR updates the call interception activation information in the MSC/VLR. The information is transferred either when the monitoring is activated or when the subscriber performs a location update. This way the interception information is present in the VLR serving the subscriber to be intercepted and can be activated when VLR detects any activities requiring legal interception. This method of activation is called VLR activation as it is the VLR that is playing the active role in activating interception.

The VLR activation described above is the default assumption in GSM networks, and thus the activation of the interception in the cases where the call to the subscriber is to be intercepted, is normally left for the VLR of the called subscriber (B-subscriber). This kind of assumption works fine if the B-subscriber is currently in his home network i.e. in the same network than this HLR is. Then the assumption that the VLR has the activation information is correct.

In the case where the B-subscriber to be intercepted is roaming in another network, this assumption that the VLR currently serving the B-subscriber knows the activation is no longer correct. Due to, for example, legal reasons information about the interception is not transferred from one network to another. Thus, the VLR currently serving the B-subscriber roaming in a different network can not activate the interception.

Due the above mentioned reason, in the currently existing implementation of GMSCs representing an access entity to a network constituting part of an interface to/from the network to e.g. another network, roaming subscribers cannot be intercepted according to VLR activation. Previously, the problem was solved so that the activations were set to a local database in a VLR of GMSC. When a new call was established via the GMSC the subscriber was searched from the local database in GMSC and interception was started according to the database. This type of solution required each GMSC to be informed about each subscriber marked to be intercepted and currently roaming in another network. As it is typical that each MSC also functions as a GMSC, this means that the information should be distributed to all MSC/VLR's in the network.

Stated in other words, in GSM networks the identity of a subscriber roaming in another network whose calls are to be legally intercepted has to be included in all VLR's. This results in a need to distribute a large amount of "intercepted target"—data in the network as each VLR has to be informed of the subscriber (i.e. his identity such as MSISDN or IMEI) to be intercepted, even if he is not present in the area of the VLR. Network operators have identified this as representing quite a drawback.

SUMMARY OF THE INVENTION

Hence, it is an object of the present invention to provide a method for intercepting a connection established in a communication network system which is free from the above drawback.

According to the present invention, this object is for example achieved by a method for intercepting a connection established in a communication network system between a called terminal and a calling terminal, said network system comprising at least two communication networks having an interface towards each other, said called terminal being registered to a subscriber database entity of one of said communication networks while being located in another one of said communication networks, the method comprising the steps of: initiating a connection establishment from said calling terminal towards said called terminal, requesting, during connection establishment, said subscriber database entity to which said called terminal is registered, for subscriber related information, detecting that said requested information contains an indication that connections to said called subscriber are to be intercepted, and tapping the established connection between the called and calling terminal at the interface between said networks.

According to advantageous further developments
  said interface is constituted by gateway functionalities representing an access point to a respective network, tapping is performed at the gateway functionality of said communication network in the subscriber database entity of which the called terminal is registered, tapped information included in said connection is forwarded from said gateway functionality to delivery functionalities, said communication networks are GSM networks and said subscriber database entity is a Home Location Register, said communication networks are GSM networks and said gateway functionalities are Gateway Mobile Switching Centers, said communication networks are third generation mobile communication networks, said communication networks are packet switched communication networks, said packet switched communication networks are Internet Protocol based communication networks, said gateway functionalities are Call State Control Functionalities, said subscriber database entity is a Home Subscriber Server.

Thus, by virtue of the present invention being implemented, monitoring of a subscriber can be activated according to information in HLR when this subscriber is roaming outside his or her home network (HPLMN) in another network. Also, in huge networks as they are currently developing, it's easier to set interception activation to the HLR than to every GMSC locally. Further, compared to prior art solution (identities stored in all VLRs) the present invention will offer same functionality with much less signaling. The principle according to the present invention is applicable in GSM (second generation networks) as well as in third generation networks and/or all-IP networks having an all-IP core network and/or IP multimedia subsystem IMS.

Thus, the advantages are clear, which are obtained by not distributing "tapping information" to each VLR, as it is the case according to prior art arrangements, but by concentrating the "tapping information" in the HLR/HSS. Namely, upon contacting a called subscriber, the HLR/HSS is always queried in order to obtain information about the subscribers' present location, and together with this, an indication as to whether the called subscriber is to be tapped/intercepted or not is obtained from the HLR.

BRIEF DESCRIPTION OF THE DRAWINGS

The present invention and its features, characteristics and advantages will subsequently be described in greater detail with reference to the accompanying drawings, in which.

DETAILED DESCRIPTION OF THE EMBODIMENTS

According to the present invention, a method for intercepting is presented which enables intercepting of a connection established in a communication network system between a called terminal and a calling terminal based on the HLR activation (activation means a "flag" in the HLR identifying that the specific subscriber is to be intercepted). The idea is that the HLR inquiry checks also the HLR activation status of a subscriber. If the query contains information that the HLR activation is on (and/or set), then the GMSC starts intercepting the called subscriber.

Stated in other words, when somebody (A-subscriber) calls another subscriber (B-subscriber) who is roaming outside his HPLMN (Home Public Land Mobile Network) the call/connection is delivered to the GMSC (Gateway Mobile Switching Center) of the B-subscriber's HPLMN. So, the GMSC represents the first contact point and/or access point to the HPLMN where interception can be activated. The call/connection is always routed via the GMSC of B-subscriber regardless of the location of the A-subscriber. That means, the A-subcriber can be inside the HPLMN of B-subscriber or in another network, as shown in FIGS. 1 and 2, respectively.

The GMSC of HPLMN performs always a HLR query. If the HLR sends the monitoring information (i.e. indication that the subscriber terminal to which the query is related is to be intercepted, e.g. "activation"=YES), and if the target of interception, i.e. the called B-subscriber, is roaming in another network than his home network HPLMN the GMSC starts monitoring/intercepting the call connection. The monitoring information could be included for example, in the MAP extensions of the response to the MapSendRoutingInformation operation.

Figure 1:
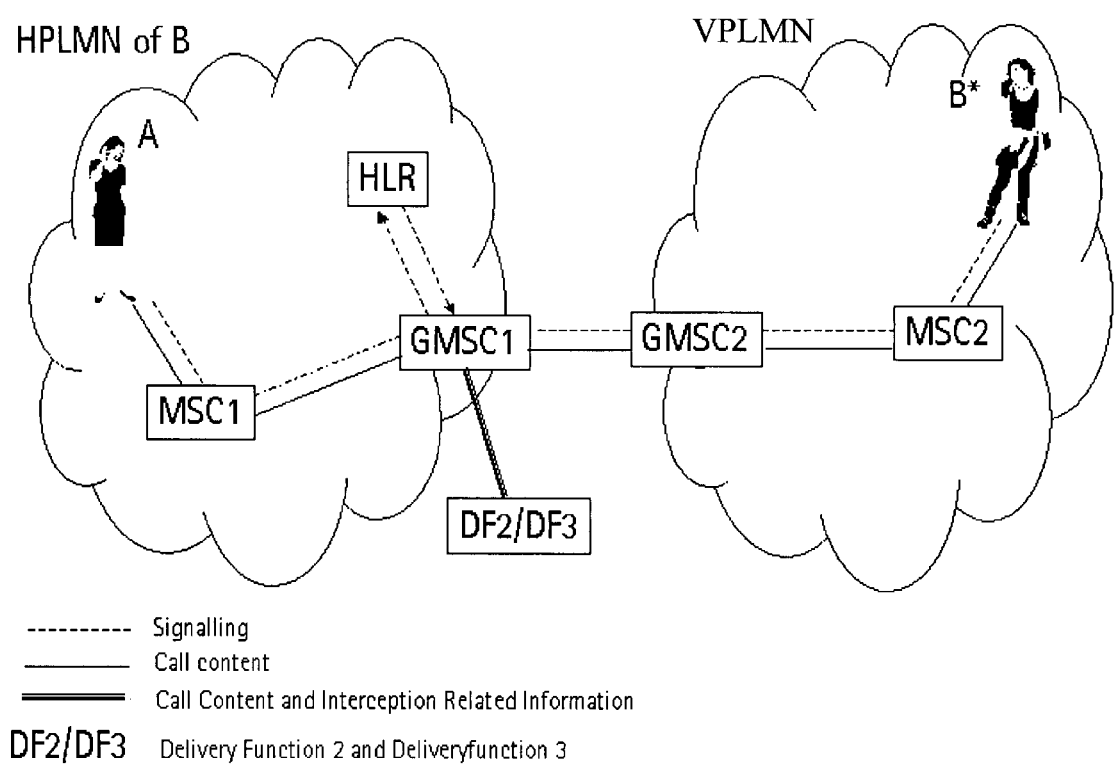
FIG. 1 shows a first intercepting scenario according to the present invention.
Figure 2:
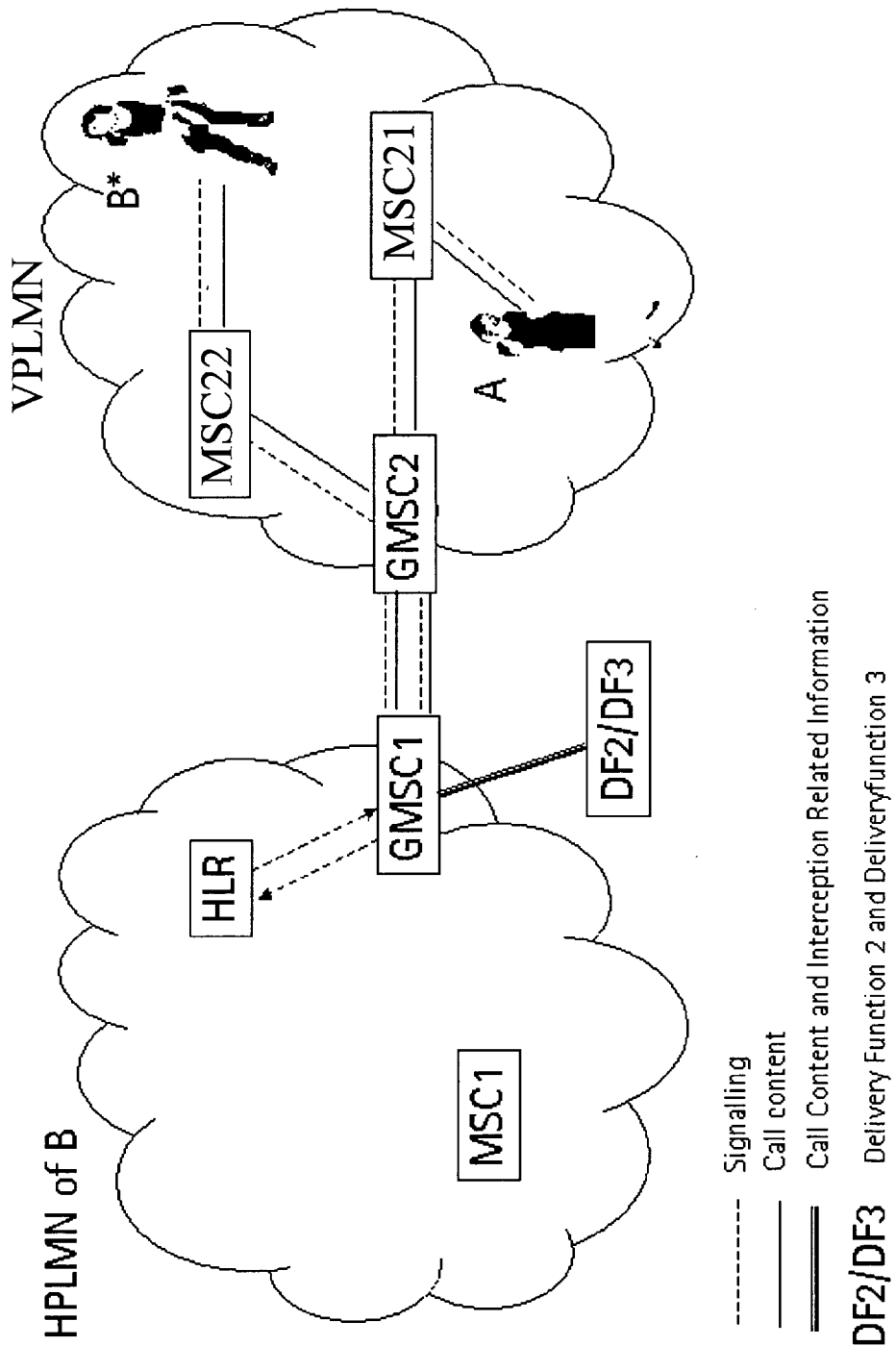
FIG. 2 shows a second intercepting scenario according to the present invention.

In detail, FIG. 1 shows a first intercepting scenario according to the present invention. The method for intercepting a connection established in a communication network system between a called terminal of subscriber B and a calling terminal of another subscriber A (not necessarily having subscribed to the same communication network as subscriber B has), will subsequently be described with reference thereto.

As illustrated, said network system comprises at least two communication networks: a home network of subscriber B, HPLMN of B, and a currently visited network VPLMN, in which the subscriber is located. Both networks have an interface towards each other, as represented by the connection between GMSC1 (of HPLMN) and GMSC2 (of VPLMN). The called terminal of subscriber B is registered to a subscriber database entity such as a home location register HLR of a GSM network (or HSS in case of a UMTS network) of one of said communication networks, i.e. the HPLMN of B, while the called subscriber is located in the another one, VPLMN, of said communication networks.

When subscriber A (located in the HPLMN in FIG. 1) initiates a connection establishment from his calling terminal A towards the called terminal B, he or she contacts the HLR via at least a Mobile Switching Center MSC1 of the HPLMN. The HLR may be contacted directly from the MSC1, while however in FIG. 1 a situation is illustrated in which the connection establishment signaling is routed from A via MSC1, GMSC1 to the HLR.

Based on the called subscriber's, i.e. B's, identity (represented by e.g. its MSISDN (Mobile Station ISDN number) or IMEI (International Mobile Equipment Identity) or any other suitable identification item for identifying the called terminal among the terminals in the network), subscriber related information is requested, during connection establishment, from said subscriber database entity (HLR or HSS) to which said called terminal B is registered. The HLR (or HSS) returns the subscriber related information to the gateway entity GMSC1.

The returned information comprise at least an identification of the called subscriber's current location, i.e. in which one of plural visited networks VPLMN he is present. (Note that FIG. 1 shows only one VPLMN to keep the drawings simple). This identification of the VPLMN is used to route the call connection establishment signaling further to the called subscriber via a gateway GMSC2 and a MSC2 of the VPLMN to the called subscriber B. In addition, the returned information enables detecting at the GMSC1 that said requested information about the called subscriber contains an indication that connections to said called subscriber B are to be intercepted. Stated in other words, the GMSC detects whether an interception flag is set ("activation"=YES) for the called subscriber in the HLR.

Based on the signaling (shown as a dotted line in FIG. 1) the connection between terminals A and B has meanwhile been established. Connection means a communication channel between two or more end-points, i.e. A and B in the illustrated scenario. Via the connection, call content is exchanged, i.e. user data such as speech, SMS, packet data or the like. The connection is indicated by a solid line in FIG. 1.

Based on the interception flag being detected, the GMSC initiates tapping the established connection between the called B and calling terminal A at the interface between said networks. More precisely, tapping is performed in GMSC1 and duplicates of data communicated via the connection (user data as well as related information) are forwarded to delivery functions 2 and 3 (DF2/DF3) for further transmission to the law enforcement agencies having requested that subscriber B is to be intercepted. Note that DF2 is in charge of delivering IRI (Intercept Related Information) while DF3 is in charge of delivering the Intercept Product IP to the law enforcement agency LEA (not shown in FIG. 1).

FIG. 2 shows a second intercepting scenario according to the present invention. According to FIG. 2, the calling subscriber and the called subscriber are in the same VPLMN, i.e. not the called subscribers HPLMN. Note that the same entities perform the same functions as explained in connection with FIG. 1 and that the same illustration for signaling/connection and intercepting paths has respectively been chosen.

The signaling path for connection establishment is then A→MSC21→GMSC2→GMSC1→HLR→GMSC1→GMSC2→MSC22→B. Note that based on the called subscribers' identification (e.g. MSISDN, IMEI or the like) it is determined by the network entities of the VPLMN that the called subscriber is a "foreign" subscriber not registered in the HLR (not shown) of the VPLMN so that the HPLMN of subscriber B is known to be required to be contacted. The inquiry of the HLR in the HPLMN yields the same information as described in connection with FIG. 1. The connection is then established as follows A→MSC21→GMSC2→GMSC1→GMSC2→MSC22→B. Also in the scenario in FIG. 2, interception is performed in GMSC1 of the HPLMN of subscriber B and the intercepted data are forwarded to DF2/DF3.

It is to be noted that also subscribers A and B need not to be in the same VPLMN. That is, subscriber B may be in a different VPLMN than the calling subscriber A, if A is not in the HPLMN of B. Also, the communication network is not restricted to be composed of mobile networks such as GSM or UMTS networks. It is also possible that a call to the called subscriber B is originated from a fixed network such as the PSTN or the like.

Figure 3:
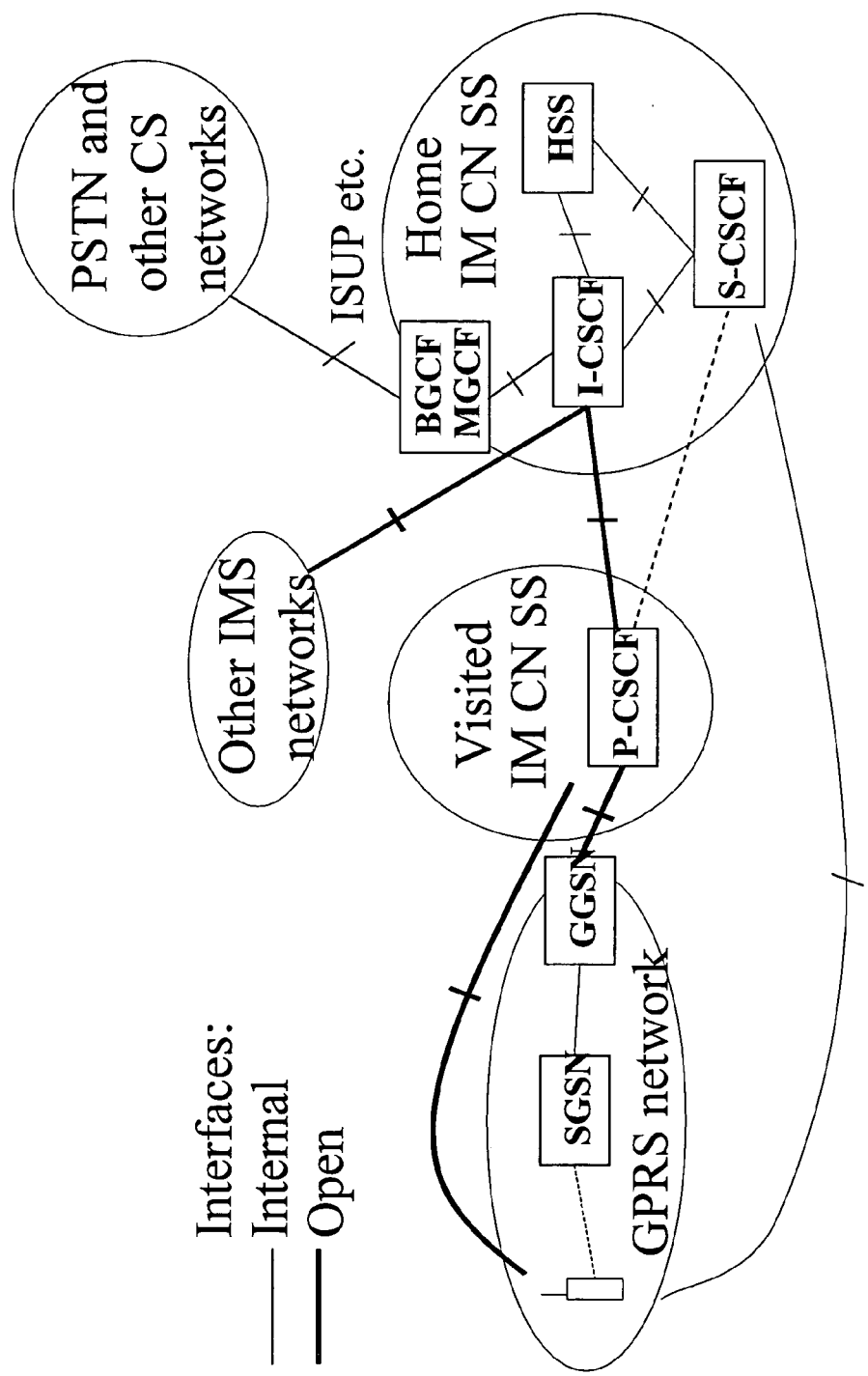
FIG. 3 shows a basic network architecture of a UMTS network for outlining that the first and second scenarios are also applicable in case of a UMTS network.

FIG. 3 shows a basic network architecture of a future packet switched network such as an all-IP (IP=Internet Protocol) based network comprising an all-IP core network (CN) and/or an IP multimedia subsystem IMS for outlining that the first and second scenarios are also applicable in case of such a non-GSM network. Since the scenarios are mutatis mutandis applicable to the UMTS or an all-IP core network (CN) and/or an IP multimedia subsystem IMS network architecture, a repeated description is considered to be dispensable. It is to be noted that the HLR of GSM corresponds to HSS in UMTS and that GMSC in GSM corresponds to I-CSCF (Interrogating Call State Control Functionality) in UMTS. Of course, an MSC corresponds also to a CSCF. Nevertheless, all entities and interfaces there between as shown in FIG. 3 are well explained in existing and currently developed standards for such networks as for example the standards mentioned before related to UMTS and/or all-IP networks.

Accordingly, as has been described herein above, the present invention relates to a method for intercepting a connection established in a communication network system between a called terminal B and a calling terminal A, said network system comprising at least two communication networks HPLMN, VPLMN having an interface towards each other, said called terminal B being registered to a subscriber database entity HLR, HSS of one of said communication networks HPLMN while being located in another one VPLMN of said communication networks, the method comprising the steps of: initiating a connection establishment from said calling terminal A towards said called terminal B, requesting, during connection establishment, said subscriber database entity HLR, HSS to which said called terminal B is registered, for subscriber related information, detecting that said requested information contains an indication that connections to said called subscriber B are to be intercepted, and tapping the established connection between the called B and calling terminal A at the interface between said networks.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. A method, comprising:
   initiating a connection establishment between a calling terminal and a called terminal,
   requesting, during connection establishment, a subscriber database of a first mobile network, to provide subscriber related information for the called terminal, the first mobile network being a home mobile communication network of the called terminal,
   detecting that both the called terminal and the calling terminal are located in a second mobile communication network visited by the roaming called terminal;
   detecting that said requested information contains an indication that connections to said called terminal are to be intercepted;
   establishing the connection from the calling terminal via a gateway functionality of the second network to a gateway functionality of the first network, back to the gateway functionality of the second network and further to the called terminal; and
   tapping the established connection between the called and calling terminal at the gateway functionality of the first network,
   said tapping comprising forwarding duplicates of the intercepted data.

2. A method according to claim 1, wherein
   said interface is constituted by gateway functionalities representing an access point to a respective network.

3. A method according to claim 1, wherein
   tapping is performed via a gateway functionality of a gateway of said first communication network.

4. A method according to claim 3, wherein
   tapped information included in said connection is forwarded from said gateway functionality to delivery functionalities.

5. A method according to claim 1, wherein
said communication networks are global system for mobile communication networks and said subscriber database is a home location register.

6. A method according to claim 2, wherein
said communication networks are global system for mobile communication networks and said gateway functionalities are gateway mobile switching centers.

7. A method according to claim 1, wherein
said communication networks are third generation mobile communication networks.

8. A method according to claim 1, wherein
said communication networks are packet switched communication networks.

9. A method according to claim 8, wherein
said packet switched communication networks are internet protocol based communication networks.

10. A method according to claim 2, wherein
said gateway functionalities are call state control functionalities.

11. A method according to claim 7, wherein
said subscriber database is a home subscriber server.

12. An apparatus, comprising:
an initiator configured to initiate a connection establishment between a calling terminal and a called terminal;
a requester configured to request, during connection establishment, a subscriber database of a home communication network of the called terminal, to provide subscriber related information for the called terminal,
a detector for detecting that both the called terminal and the calling terminal are located in a second communication network visited by the roaming called terminal;
a detector configured to detect that said requested information contains an indication that connections to said called terminal are to be intercepted;
an establisher configured to establish the connection from the calling terminal via a gateway functionality of the second network to a gateway functionality of the first network, back to the gateway functionality of the second network and further to the called terminal; and
a tapper configured to tap the established connection between the called and calling terminal at the gateway functionality of the first network, the tapper being further configured to duplicate intercepted data.

13. An apparatus, comprising:
initiating means for initiating a connection establishment between a calling terminal towards a called terminal;
requesting means for requesting, during connection establishment, a subscriber database of a first mobile network, to provide subscriber related information for said called terminal, the first mobile network being a home communication network of the called terminal,
detecting means for detecting that both the called terminal and the calling terminal are located in a second mobile communication network visited by the roaming called terminal;
detecting means for detecting that said requested information contains an indication that connections to said called terminal are to be intercepted;
establishing means for establishing the connection from the calling terminal via a gateway functionality of the second network to a gateway functionality of the first network, back to the gateway functionality of the second network and further to the called terminal; and
tapping means for tapping the established connection between the called and calling terminal at the gateway functionality of the first network,
the tapping means being configured to duplicate intercepted data.

14. A system, comprising
an interface towards at least one other communication network,
a subscriber database to which at least a called subscriber terminal can be registered,
an initiator adapted to initiate a connection establishment from a calling terminal towards said called terminal,
a requestor configured to request, during connection establishment, said subscriber database to which said called terminal is registered, for subscriber related information,
detector configured to detect that said requested information contains an indication that connections to said called subscriber are to be intercepted,
an establisher configured to establish the connection from the calling terminal via a gateway functionality of the second network to a gateway functionality of the first network, back to the gateway functionality of the second network and further to the called terminal;
a tapper configured to tap the established connection between the called terminal and the calling terminal at the interface,
wherein said interface is constituted by a gateway functionality representing an access point to the network, and
wherein the tapper is located at the gateway functionality of a home network of the called terminal.

15. The apparatus according to claim 12, being configured to forward tapped information included in said connection from said gateway functionality to delivery functionalities.

16. An apparatus system according to claim 12, wherein
at least one of said networks is a global system for mobile communications network, and said subscriber database is a home location register.

17. An apparatus according to claim 12, wherein
said network is a global system for mobile communications network and said gateway functionality is a gateway mobile switching center.

18. An apparatus according to claim 12, wherein
said at least one of the networks is a third generation mobile communication network, a packet switched communication network, or an internet protocol based communication network.

19. An apparatus according to claim 12, wherein said gateway functionality is a call state control functionality.

20. An apparatus according to claim 12, wherein said subscriber database is a home subscriber server.

21. The apparatus according to claim 12, wherein said interface is constituted by gateway functionalities representing an access point to a respective network.

22. The apparatus according to claim 12, wherein the tapper is configured to tap via a gateway functionality of a gateway of said first communication network in the subscriber database of which the called terminal is registered.

23. The apparatus according to claim 21, wherein the tapper is configured to forward tapped data included in said connection from said gateway functionality to delivery functionalities.

24. The apparatus according to claim 12, wherein said communication networks are global system for mobile communication networks and said subscriber database is a home location register.

25. The apparatus according to claim 21, wherein said communication networks are global system for mobile communication networks and said gateway functionalities are gateway mobile switching centers.

26. The apparatus according to claim 12, wherein said communication networks are third generation mobile communication networks.

27. The apparatus according to claim 12, wherein said communication networks are packet switched communication networks.

28. The apparatus according to claim 27, wherein said packet switched communication networks are internet protocol based communication networks.

29. The apparatus according to claim 27, wherein said gateway functionalities are call state control functionalities.

30. The apparatus according to claim 12, wherein said subscriber database is a home subscriber server.

* * * * *